April 12, 1966     D. F. LARSON     3,245,509
MACHINE CONTROL WITH INFRA-RED DETECTOR
Filed March 30, 1961
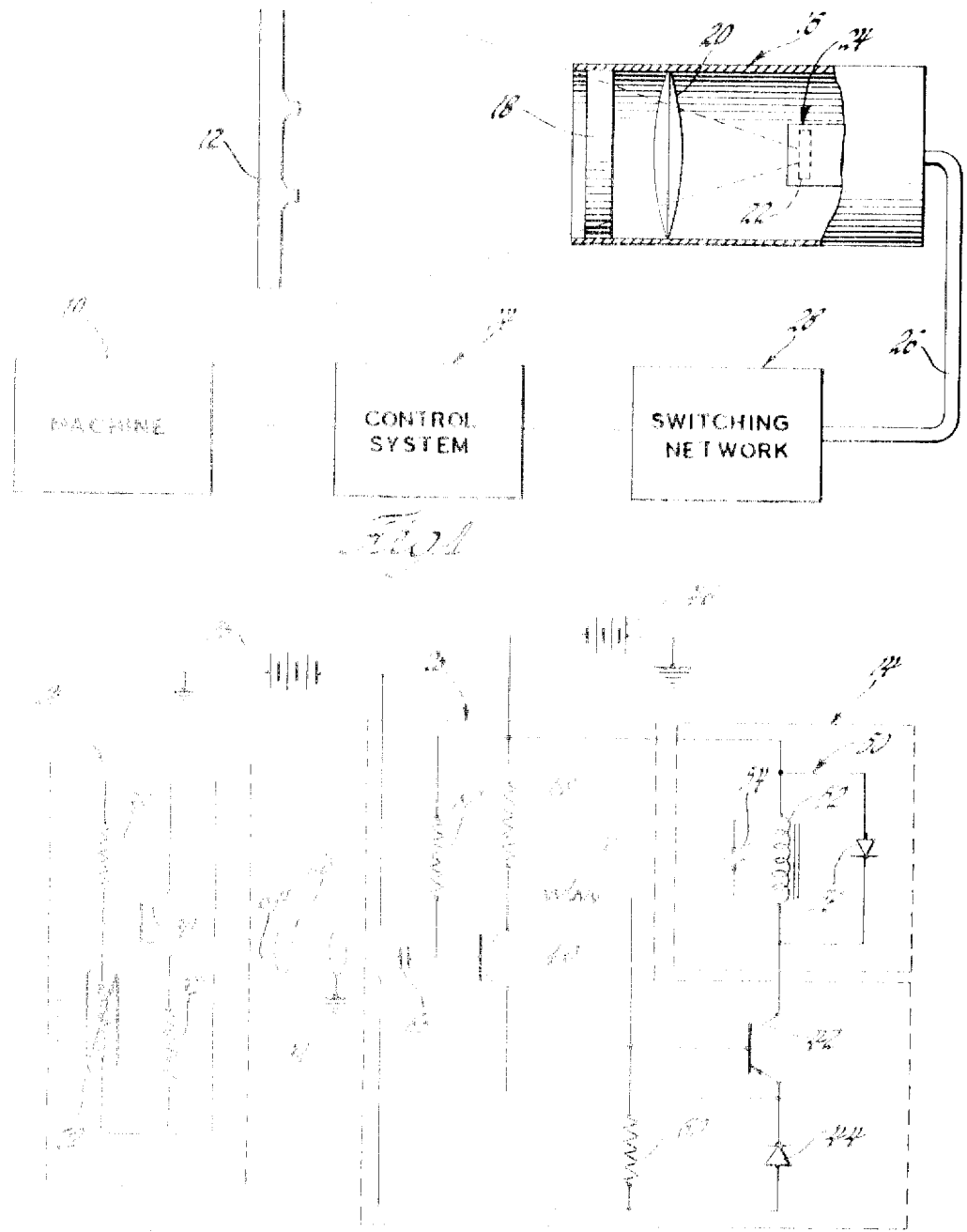
INVENTOR.
ATTORNEY ical Office 3,245,509
Patented Apr. 12, 1966

3,245,509
MACHINE CONTROL WITH INFRA-RED DETECTOR
Dale F. Larson, Detroit, Mich., assignor to General Motors Corporation, Detroit, Mich., a corporation of Delaware
Filed Mar. 30, 1961, Ser. No. 99,525
15 Claims. (Cl. 192—125)

This invention relates to improvements in machine control systems and particularly concerns those machines employed, although not exclusively, for processing and/or fabricating parts or materials.

Many processes involving automation require special apparatus for determining automatically whether a predetermined cycle of events is occurring according to a desired scheme. A die casting machine in which hot cast parts are systematically ejected from the machine after they have been cast is an example of this apparatus. Obviously, if a part has not been properly ejected, the subsequent casting of a part or parts can produce undesirable results.

In the past, mechanical apparatus has been employed to re-cycle such a die casting machine only after it is known that a part has been properly ejected. This mechanical apparatus was, however, easily damaged by falling parts, or the operation was noticeably hampered by the environmental heat. Photoelectric devices have been utilized but too are not completely satisfactory for they easily can become misaligned. Moreover, photoelectrical detection is always subject to false indication from dirt, cold objects, and even movements of the operator if he intercepts the light beam.

Accordingly, the invention contemplates the detection of objects or materials in a way that substantially eliminates the chance for false indications. More specifically stated, the invention affords an arrangement wherein infra-red radiation from objects or materials is detected and this information is utilized to indicate the presence of these objects or materials. This information may thereafter be employed so as to cause the machine to perform according to a predetermined scheme.

A related, still more particular aim of the invention is to develop a control pulse whenever a certain object or material is sensed and then utilize this control pulse to trigger on and off a switching arrangement that may be interrelated with a machine control system.

The foregoing and other objects and advantages of the invention will become apparent from the following description and from the accompanying drawings in which:

FIGURE 1 is a block diagram of an arrangement incorporating the principles of the invention; and FIGURE 2 is a diagram of the circuitry employed in the FIGURE 1 arrangement.

Referring to the drawings in detail and first to FIGURE 1, the numeral 10 denotes generally a machine of a type that processes and/or fabricates hot parts or materials, e.g., a brazing furnace, a heat treat oven, a bake booth, casting apparatus, etc. For demonstration purposes and without limitation, it will be assumed that the machine 10 is for die casting purposes and is so constructed that hot parts 12 are automatically ejected once cast; thereafter, a suitable control system 14 causes the machine to be re-cycled and another part 12 cast.

As was suggested and as can now be appreciated, with this general type machine 10 if one of the hot cast parts 12 was not properly ejected, the control system 14 would re-cycle the machine, being unaware that the previously cast part had not been removed. This, of course, could destroy several parts before the malfunction was discovered and could even damage the machine 10 itself. To avoid this, provision is made for sensing the ejected parts 12 through the use of a detecting head 16 positioned in the vicinity of the machine 10 so as to have a detection zone through which the ejected parts 12 are compelled to pass as they proceed to another station. The detecting head 16 may be of any desired shape but in this embodiment is preferably of a cylindrical configuration and contains a suitable filter 18 and a lens 20. Behind the lens 20 is an infra-red detector 22 and a heat pulse forming circuit 24, the details of which will be described in the discussion of FIGURE 2.

When a hot part 12 passes through the detection zone of the detecting head 16, the resultant infra-red radiation from the part 12 is filtered by the filter 18 and focused by the lens 20 on the infra-red detector 22. The type of filter 18 will determine the wave length of the infra-red rays and will be in turn determined by the type and temperature of the part or material being sensed. This radiation will cause the pulse forming circuit 24 to produce a heat pulse, which will be transferred through a protective cable 26 to a switching network 28, usally remotely positioned with respect to the detecting head 16. The switching network 28 will then, as will become apparent, actuate the control system 14, whereupon the machine 10 will be re-cycled and the next part 12 cast with the assurance that the previous part 12 has been properly ejected.

As illustrated in FIGURE 2, the pulse forming circuit 24 includes a suitable amplifying device as the control transistor 30, which may be of the PNP junction type. The emitter of this control transistor 30 extends through a dropping resistor 32 to ground at 34, whereas the collector thereof is connected to the negative terminal of a relatively high voltage source 36. Completing the pulse forming circuit 24 is a bias resistor 38 interposed between the base and collector of the control transistor 30. The infra-red detector 22 is connected to the base of the control transistor 30 and is also grounded at 34. The detector 22 may be of any appropriate kind but in this embodiment is preferably an adjustable semiconductor whose resistance decreases with increased exposure to infra-red radiation. By permitting the infra-red detector 22 to be adjusted, the detector 22 can be used in different environments with different backgrounds.

When the detector 22 is exposed to heat rays, its resistance will decrease very rapidly, whereupon the conduction of the control transistor 30 will be changed. In this application, the control transistor 30 is normally conductive, but when the resistance of the detector 22 decreases, the voltage drop across the detector 22 will be less and cause the base of the control transistor 30 to become more positive than before. This will reduce the conduction by the control transistor 30 and accordingly the potential of the emitter will rise due to the decrease in the voltage drop across resistor 32.

For demonstration purposes and without limitation, the resistances of the detector 22 and bias resistor 38 are such that only objects at temperatures above 350° F. are sensed. This permits the influence from either the environment or the background to be virtually eliminated.

The switching network 28 includes two amplifying devices, which may be also PNP junction transistors. These devices will hereinafter be referred to as switching transistors 40 and 42. The emitters of both of these transistors 40 and 42 are grounded at 34 through a voltage regulating or stabilizing element as diode 44, whereas both collectors are connected to a negative terminal of a relatively low voltage source 46. This diode 44, for reasons to be explained, is of a type that always has a relatively constant voltage drop across it despite changes in current flow. As will be noted, the collector of switching transistor 40 is connected to the source 46 through a load resistor 48 and the collector of the switching transistor 42 is connected to the source 46 also through a load that may be a component of the control system 14 to be actuated. For instance, this component may be a control relay as denoted at 50 and of a character that includes a winding 52 and relay contacts 54, which are operated when the winding 52 is energized. To limit transient voltages across the winding 52 resulting from interruption of current flow, a diode 56 is arranged in parallel with the winding 52 so as to afford a shunt path for the current induced by collapse of the winding flux field. Otherwise, these transient voltages could damage the transistors 40 and 42.

The base of the switching transistor 42 is connected both to the collector of switching transistor 40 and to ground through a voltage divider comprising resistors 58 and 60. These resistors 58 and 60 provide the bias for the switching transistor 42. The operating point for switching transistor 40 is controlled by a bias resistor 62.

The connection between the pulse forming circuit 24 and the switching network 28 is made by a conductor 64 extending through the cable 26. The conductor 64 interconnects the emitter of the control transistor 30 and the base of the switching transistor 40 with the coupling being made by a capacitor 66. This capacitor 66 isolates the high voltage source 36 from the low voltage source 46 and will charge during normal operation to a quiescent voltage equivalent to a portion of the voltage from the source 36, e.g., one-half of the source 36 voltage.

It should be mentioned here that a separate and relatively high voltage as the obtained from the source 36 is preferred for use with the infra-red detector 22. With a high voltage detector 22 becomes considerably more sensitive to changes in infra-red radiation.

It is believed that the following operational summary will facilitate a better understanding of the functions of the various components in the pulse forming circuit 24 and the switching network 28. Since the arrangement, when employed with a die casting machine, responds only to two different conditions, each will be separately described.

First, with no hot part 12 passing through the detection zone of the detecting head 16, the resistance of the infra-red detector 22 will be relatively high, and as a consequence, the voltage drop thereacross will cause the base of the control transistor 30 to be sufficiently negative for control transistor 30 to be relatively highly conductive. This conduction as long as stable will have no influence on the switching transistor 40, which will be normally conductive due to the bias resistor 62 and further because the base of the switching transistor 40 will be slightly more negative than the emitter thereof. When the switching transistor 40 is conducting, the collector thereof is more negative than the emitter and accordingly the emitter of the switching transistor 42 will be more negative than the base of the switching transistor 42 due to a voltage division from resistors 58 and 60, and will be non-conductive.

To explain this non-conductive state of the switching transistor 42, it will be assumed that a one volt drop occurs across the stabilizing diode 44 so that both of the emitters for the transistors 40 and 42 are at a negative potential of one volt. It will be further assumed that the collector of the transistor 40 is at a potential of minus one and one-half volts. By dropping this voltage across the resistors 58 and 60, it can be seen that with both resistors 58 and 60 being equal, the base of the transistor 42 would be at a divided down voltage of minus .75 volt. Consequently, since this base voltage is higher than the emitter voltage, the transistor 42 will not conduct and the relay 50 will be deenergized.

When a hot part 12 passes through the detecting zone of detecting head 16, the resistance of the infra-red detector 22 will decrease, as mentioned, so that the base of the control transistor 30 becomes more positive. This reduces conduction by the control transistor 30, whereupon the emitter of the control transistor 30 will become more positive and the resultant positive pulse will be applied to the base of the switching transistor 40. With the base of the switching transistor 40 more positive, conduction through the transistor 40 will reduce and this in turn will cause the potential of the collector of the transistor 40 to approach that of the low voltage source 46. When the collector voltage of the switching transistor 40 goes more negative, the base of the switching transistor 42 will similarly become more negative and the switching transistor 42 will start to conduct. Now, both switching transistors 40 and 42 will be transferring current and a regenerative effect will take place due to the fact that both emitters for the transistors 40 and 42 will become slightly more negative. With the base of the switching transistor 40 already more positive because of the heat pulse produced by the circuit 24, the causing of the emitter to become more negative will quickly cut off the switching transistor 40.

The rendering of the emitter for switching transistor 42 slightly more negative has relatively no effect on its operation because of the relatively large negative voltage on the base. This large negative voltage causes the switching transistor 42 to draw a relatively large current, sufficient to operate the power relay 50 and cause the machine 10 to be re-cycled.

The reason for utilizing the stabilizing diode 44 now becomes apparent, for, by way of example only, the switching transistor 40 preferably draws a current of one milliampere so as to be capable of triggering with a relatively weak signal, whereas the switching transistor 42 draws a current of one hundred milliamperes. As can be appreciated, if a resistor were used instead of diode 44, the two different currents passing therethrough would result in a voltage variation of one hundred to one. Under these conditions, a very large trigger voltage would be required. By using the stabilizing diode 44, the voltage of the emitters for the switching transistors 40 and 42 always remains substantially at a minus one volt whether one milliampere or one hundred milliamperes is being drawn. Hence, there is little hysteresis and a relatively weak heat pulse will produce the desired triggering.

From the foregoing, it can now be appreciated that by being able to use a relatively large detection zone, alignment of the detecting head 16 offers little or no problem. Aslo, background effects, e.g., heat, and its influence, can be entirely eliminated by having the system respond to only a change in the radiation from the hot background and, therefore, only hot moving parts are detected. Any stray cold objects such as an operator's arm will not cause a false detection. These and the many other features render the detector reliably accurate and quickly operating.

The invention is to be limited only by the following claims wherein I claim:

1. In a control system for a machine; the combination of a control for the machine; means detecting infra-red radiation from an object associated with the machine and developing a corresponding electrical signal; and switching means responsive to and the electrical signal for operating the control; the switching means including a voltage source and a pair of amplifying devices connected in parallel across the source and interconnected to provide a differential triggering action so that when one assumes one state of operation the other assumes the opposite state of operation, the amplifying devices being operative to connect the control to the source when the electrical signal is of a certain level and to disconnect the control from the source when the electrical signal is of a certain different level.

2. In a control system for a machine, the combination of a control for the machine, means detecting infra-red radiation from a moving object associated with the machine and developing a corresponding electrical signal, switching means responsive to the electrical signal for operating the control, a voltage source, the switching means including a pair of trigger devices arranged to provide a differential triggering action so as to connect and disconnect the control to and from the voltage source when the electrical signal is respectively of a certain level and of a certain different level, voltage regulating means stabilizing the differential triggering action of the switching means so as to increase the sensitivity of the switching means to relatively weak electrical signals.

3. In a control system for a machine; the combination of a control for the machine; means detecting infra-red radiation from an object associated with the machine and causing the detected radiation to be converted into an electrical signal; and switching means responsive to the electrical signal for operating the control; the switching means including a voltage source, a pair of amplifying devices connected in parallel across the source and interconnected to provide a differential triggering action so that when one assumes one state of operation the other assumes an opposite state of operation, the amplifying devices being operative to connect the control to the source when the electrical signal is of a certain level and to disconnect the control from the source when the electrical signal is of a certain different level; and voltage regulating means stabilizing the operation of the devices.

4. In a control system for a machine; the combination of a control for the machine; means detecting infra-red radiation from an object associated with the machine and causing the detected radiation to be converted into an electrical signal; switching means responsive to the electrical signal for operating the control; the switching means including a voltage source, first and second amplifying devices each including emitter, collector, and control electrodes, and a voltage regulating element, the emitter electrodes for each device being connected through the voltage regulating element to the high potential terminal of the voltage source, the collector electrodes being connected to the other terminal of the voltage source, the collector electrode for the second device being connected to the other terminal through the control, the control electrode for the first device having the electrical signal from the detecting means applied thereto so as to change the conductive state thereof in accordance with the level of the electrical signal, the control electrode for the second device being coupled through a voltage divider to the collector electrode of the first device to provide a differential triggering action so that a change in the conductive state of the first device will alter the conductive state of the second device and thereby cause the control to be correspondingly energized and deenergized by the voltage source.

5. In a control system for a machine; the combination of a control for the machine; means detecting infra-red radiation from a moving object associated with the machine; means converting the detected radiation into an electrical signal; and switching means operative to control a load in response to the electrical signal; the switching means including a voltage source, and a trigger circuit having first and second switching transistors and a voltage stabilizing diode, the emitters of the transistors being connected to the high potential terminal of the voltage source each through the stabilizing diode, the collectors of the transistors being connected through separate loads to the other terminal of the voltage source, one load being the control, the base of the first transistor having the electrical signal applied thereto, the first transistor being so biased as to be nonconductive when the electrical signal is of a certain level and to be nonconductive when the electrical signal is of a certain different level, the base of the second transistor being connected to the collector of the first transistor through a voltage divider so that the second transistor is conductive and nonconductive when the first transistor is respectively nonconductive and conductive to provide a differential triggering action and thereby cause the control to be correspondingly energized and deenergized.

6. In a control system for a machine, the combination of a control for the machine, a detector including an element constructed and arranged so that the impedance thereof varies with infra-red radiation, the detector being adapted to sense infra-red radiation from a part associated with the machine, means focusing the radiation on the detector so that parts to be detected and passing by the focusing means will cause the impedance of the element to change, a pluse forming network including an amplifying device, the conduction through which is varied as the impedance of the element changes so as to develop a corresponding pulse, switching means coupled to the pulse forming network and so arranged as to operate the control in response to the pulse, a voltage source, the switching means including a pair of trigger devices arranged to provide a differential triggering action so as to connect and disconnect the control to and from the voltage source when the pulse is respectively of a certain level and of a certain different level, and voltage regulating means stabilizing the differential triggering action of the switching means so as to increase the sensitivity of the switching means to the pulse.

7. In a control system for a machine; the combination of means detecting infra-red radiation from an object associated with the machine; a pulse forming network including a source of voltage and a control transistor having the emitter thereof connected through a resistor to the high potential terminal of the voltage source, the collector thereof connected to the other terminal of the voltage source, and the base thereof coupled to the detecting means and also to the high potential terminal of the voltage source, the control transistor being so arranged as to have the conduction therethrough altered whenever an object is detected and thereby develop a corresponding pulse; and switching means coupled to the pulse forming network and so arranged as to be triggered on and off by the pulse; the switching means being adapted to control the machine in response to the pulse.

8. In an control system for a machine; the combination of means detecting infra-red radiation from an object associated with the machine; a pulse forming network including a source of voltage and a control transistor having the emitter thereof connected through a resistor to the high potential terminal of the voltage source, the collector thereof connected to the other terminal of the voltage source, and the base thereof coupled to the detecting means and also to the high potential terminal of the D.C. voltage source, the control transistor being so arranged as to have the conduction therethrough altered whenever an object is detected and thereby develop a corresponding pulse; and switching means coupled to the pulse forming network and so arranged as to be triggered on and off by the pulse; the switching means being adapted to control the machine in response to the pulse; and a voltage regulating means for stabilizing the operation of the switching means.

9. In a control system for a machine; the combination of a control for the machine; a detector so arranged as to have the impedance thereof change with variations in infra-red radiation from an object associated with the machine when moving past the detector; a pulse forming network coupled to the detector so as to develop a control pulse when an object is detected; and switching means responsive to the control pulse for operating the control; the switching means including a voltage source, a pair of amplifying devices communicating with the source and interconnected to provide a differential triggering action in response to the level of the control pulse so that when one assumes one state of operation, the other assumes an opposite state of operation, the amplifying devices being operative to connect the control to the source when the control pulse is of a certain level and disconnect the control from the source when the control pulse is of a certain different and lower level, and voltage regulating means stabilizing the operation of the devices.

10. In a control system for a machine; the combination of a control for the machine; a detector including an element constructed and arranged so that the impedance thereof varies with infra-red radiation from a part associated with the machine; means focusing the radiation on the detector so that objects to be detected in passing by the focusing means will cause the impedance of the element to change; a pulse forming network including an amplifying device, the conduction through which is varied as the impedance of the element changes so as to develop a corresponding pulse; and switching means coupled to the pulse forming network and arranged to operate the control in response to the level of the pulse; the switching means including a voltage source, a pair of amplifying devices connected in parallel across the source and interconnected to provide a differential triggering action in response to the level of the pulse so that when one assumes one state of operation the other assumes an opposite state of operation, the amplifying devices being operative to connect and disconnect the control to and from the source when the pulse is respectively of a certain level and of a certain different and lower level, and voltage regulating means common to both devices for stabilizing the operation of the devices.

11. In a control system for a machine; the combination of means detecting infra-red radiation from an object associated with the machine; a pulse forming network including a source of voltage and a control transistor having the emitter thereof connected through a resistor to the high potential terminal of the voltage source, the collector thereof connected to the other terminal of the voltage source, and the base thereof coupled to the detecting means and also to the high potential terminal of the voltage source, the control transistor being so arranged as to have the conduction therethrough altered whenever an object is detected and thereby develop a corresponding pulse; and switching means coupled to the pulse forming network, the switching means including a source of electrical energy, first and second amplifying devices each including emitter, collector and control electrodes, and a voltage stabilizing element, the emitter electrodes for each device being connected through the voltage stabilizing element to the high potential terminal of the energy source, the collector electrodes being connected to the other terminal of the energy source, the collector electrode for the second device being connected to the other terminal of the energy source through a load adapted to control the machine, the control electrode for the first device having the control pulse applied thereto so as to alter the conductive state thereof, the control electrode for the second device being so coupled to the collector electrode of the first device that a change in the conductive state of the first device will alter the conductive state of the second device.

12. In a control system for a machine; the combination of a detector including a resistive element constructed and arranged so that the resistance thereof decreases with increased radiation; means focusing the radiation on the detector; the detector being adapted to sense radiation from objects associated with the machine and passing by the focusing means thereby causing the resistance of the resistive element to be decreased; a pulse forming circuit including a source of D.C. voltage and a control transistor having the emitter thereof connected through a resistor to the high potential terminal of the D.C. voltage source, the collector thereof connected to the other terminal of the D.C. voltage source, and the base thereof connected through the resistive element and also to the high potential terminal of the D.C. voltage source, the control transistor being so arranged as to have the conduction therethrough decreased whenever the resistance of the resistive element decreases; a switching network for operating a machine actuator; the switching network including a voltage source and a trigger circuit having a stabilizing diode and first and second switching transistors, the emitters thereof being connected to the high potential terminal of the voltage source through the stabilizing diode, the collectors thereof being connected through separate loads, one of which is adapted to control the machine, the other terminal of the voltage source, the base of the second transistor being connected to the collector of the first transistor through a voltage divider so that the second transistor conducts when the first transistor is non-conductive; and an isolating capacitor; the base of the first switching transistor being coupled through the isolating capacitor to the emitter of the control transistor so that the first switching transistor is rendered non-conductive and the second transistor conductive thereby energizing the one load when a pulse is developed by the pulse forming circuit.

13. In a control system; the combination of a load; means detecting infra-red radiation from an object and causing the detected radiation to be converted into an electrical signal; switching means controlling the load in response to the level of the electrical signal so that when the electrical signal is of a certain level the load is caused to be energized and when the electrical signal is of a different certain level the load is caused to be deenergized; the switching means including a voltage source, first and second amplifying devices each including emitter, collector, and control electrodes, and a voltage stabilizing element, the emitter electrodes for each device being connected through the voltage stabilizing element to the high potential terminal of the voltage source, the collector electrodes being connected to the other terminal of the voltage source, the collector electrode for the second device being connected to the other terminal through a load, the control electrode for the first device having the electrical signal from the detecting means applied thereto so as to alter the conductive state thereof when the electrical signal is of the certain level, the control electrode for the second device being so coupled to the collector electrode of the first device to provide a differential triggering action so that a change in the conductive state of the first device will alter the conductive state of the second device and correspondingly connect and disconnect the load to and from the voltage source.

14. In a control system; the combination of a detector so arranged as to have the impedance thereof change with variations in infra-red radiation from an object moving past the detector; a pulse forming network coupled to the detector so as to develop a control pulse when an object is detected; and switching means operative to control a load in response to the control pulse; the switching means including a voltage source, a pair of amplifying devices communicating with the source and interconnected to provide a differential triggering action in response to the level of the control pulse so that when one assumes one state of operation, the other assumes an opposite state of operation, the amplifying devices being operative to connect the source and the load when the control pulse is of a certain level and disconnect the source and the load when the control pulse is of a certain different level, and voltage regulating means common to each device for stabilizing the differential triggering action of the devices.

15. In a control system; the combination of a detector including a resistive element constructed and arranged so that the resistance thereof decreases with increased radiation; means focusing the radiation on the detector so that objects to be detected and passing by the focusing means will cause the resistance of the resistive element to be decreased; a pulse forming circuit including a source of D.C. voltage and a control transistor having the emitter thereof connected through a resistor to the high potential terminal of the D.C. voltage source, the collector thereof connected to the other terminal of the D.C. voltage source, and the base thereof connected through the resistive element and also to the high potential terminal of the D.C. voltage source, the control transistor being so arranged as to have the conduction therethrough decreased whenever the resistance of the resistive element decreases; a switching network for controlling a load; the switching network including a voltage source and a trigger circuit having a stabilizing diode and first and second switching transistors, the emitters thereof being connected to the high potential terminal of the voltage source through the stabilizing diode, the collectors thereof being connected through separate loads to the other terminal of the voltage source, the base of the second transistor being connected to the collector of the first transistor through a voltage divider so that the second transistor conducts when the first transistor is non-conductive; and an isolating capacitor; the base of the first switching transistor being coupled through the isolating capacitor to the emitter of the control transistor so that the first switching transistor is rendered non-conductive and the second transistor conductive when a pulse is developed by the pulse forming circuit.

References Cited by the Examiner
UNITED STATES PATENTS

| | | | |
|---|---|---|---|
| Re. 23,295 | 11/1950 | Liston | 250—83.3 |
| Re. 24,983 | 5/1961 | Gallagher et al. | 250—83.3 |
| 1,791,938 | 2/1931 | Schroeter et al. | 250—83.3 |
| 2,317,839 | 4/1943 | Westin | 192—125 |
| 2,423,278 | 7/1947 | Willis | 250—83.3 |
| 2,811,126 | 10/1957 | Ford | 192—125 |
| 2,897,485 | 7/1959 | Johnson | 250—83.3 |
| 2,915,638 | 12/1959 | Poole | 250—83.3 |
| 2,933,956 | 4/1960 | Snow. | |
| 2,967,940 | 1/1961 | Erb et al. | 250—83.3 |
| 2,999,933 | 9/1961 | Green | 250—83.3 |
| 3,023,398 | 2/1962 | Siegert | 250—83.3 |
| 3,029,421 | 4/1962 | Beguin. | |
| 3,076,090 | 1/1963 | Stapelfeldt | 250—83.3 |

FOREIGN PATENTS 206,008   2/1957   Australia.

DAVID J. WILLIAMOWSKY, *Primary Examiner.*

THOMAS J. HICKEY, *Examiner.*